United States Patent
Wheeler

(10) Patent No.: US 11,621,603 B2
(45) Date of Patent: Apr. 4, 2023

(54) PORTABLE HOUSING FOR USE WITH PORTABLE ELECTRIC GENERATORS

(71) Applicant: James Michael Wheeler, Morris, CT (US)

(72) Inventor: James Michael Wheeler, Morris, CT (US)

(*) Notice: Subject to any disclaimer, the term of this patent is extended or adjusted under 35 U.S.C. 154(b) by 419 days.

(21) Appl. No.: 16/940,892

(22) Filed: Jul. 28, 2020

(65) Prior Publication Data

US 2021/0408865 A1 Dec. 30, 2021

Related U.S. Application Data

(60) Provisional application No. 63/045,065, filed on Jun. 27, 2020.

(51) Int. Cl.
| | | |
|---|---|---|
| *H02K 5/22* | (2006.01) | |
| *B65D 88/52* | (2006.01) | |
| *E04H 1/12* | (2006.01) | |
| *H02K 5/20* | (2006.01) | |

(52) U.S. Cl.
CPC ............. *H02K 5/22* (2013.01); *B65D 88/528* (2013.01); *E04H 1/1238* (2013.01); *H02K 5/207* (2021.01); *H02K 2205/09* (2013.01)

(58) Field of Classification Search
CPC ...... H02K 5/22; H02K 5/207; H02K 2205/09; H02K 7/1815; H02K 5/10; B65D 88/00–528; E04H 1/1238
See application file for complete search history.

(56) References Cited

U.S. PATENT DOCUMENTS

| | | | |
|---|---|---|---|
| 3,561,634 A | * | 2/1971 | Meldrum ............... B65D 88/12 |
| | | | 220/4.28 |
| 3,807,104 A | | 4/1974 | Webster |
| 4,279,105 A | | 7/1981 | Cameron |
| 4,838,525 A | | 6/1989 | Snow et al. |
| 8,870,150 B2 | | 10/2014 | Wang |
| 8,997,769 B2 | | 4/2015 | Carpenter |
| 9,124,148 B2 | | 9/2015 | Wood et al. |
| 10,696,467 B2 | * | 6/2020 | Moon .................. B65D 43/167 |
| 2015/0144640 A1 | * | 5/2015 | Kaya ..................... B65D 88/14 |
| | | | 220/560.01 |
| 2016/0075510 A1 | * | 3/2016 | Clive-Smith ........ B65D 90/046 |
| | | | 206/520 |

(Continued)

*Primary Examiner* — Kareen K Thomas
(74) *Attorney, Agent, or Firm* — Wendy W. Koba, Esq.

(57) ABSTRACT

A protective housing is formed of a set wall panels, a base panel, and a lid panel that interlock to form the housing, but may also be taken apart and stored as a stack of two-dimensional panels when not in use. The various panels interlock via configurations internal to the housing itself, so that once an external lock is placed to secure the access door to the front wall panel, it is completely self-contained and impossible to dismantle or otherwise take apart the individual components of the housing from the outside. The rear wall and/or a side wall are formed to include exhaust locations for an included generator, thus requiring no additional ventilation system to be separately constructed and included. The walls may be formed of steel, high density plastic, fiberglass, or other suitable rugged material appropriate for use in structures exposed to the environment.

14 Claims, 15 Drawing Sheets

(56) References Cited

U.S. PATENT DOCUMENTS

| | | | |
|---|---|---|---|
| 2016/0137404 A1* | 5/2016 | Steiner | B61D 9/14 |
| | | | 220/1.5 |
| 2016/0145039 A1* | 5/2016 | Bowser | B65D 88/005 |
| | | | 220/1.5 |
| 2017/0057738 A1* | 3/2017 | Kleis | B65D 90/008 |
| 2017/0096295 A1* | 4/2017 | Pherson | B65D 90/22 |
| 2017/0144832 A1* | 5/2017 | Looker | B65D 90/021 |
| 2017/0267449 A1* | 9/2017 | Sheppard | B65D 90/00 |
| 2018/0086186 A1* | 3/2018 | Haag | B60P 1/28 |
| 2018/0086548 A1* | 3/2018 | Heath | B64F 1/322 |
| 2019/0367263 A1* | 12/2019 | Chabot | B65D 90/0046 |
| 2020/0039739 A1* | 2/2020 | Robichaux | B65D 88/126 |
| 2020/0071069 A1* | 3/2020 | Press | B65D 88/522 |
| 2020/0079583 A1* | 3/2020 | Press | B65G 69/00 |
| 2021/0070540 A1* | 3/2021 | Pherson | A44B 19/34 |

\* cited by examiner

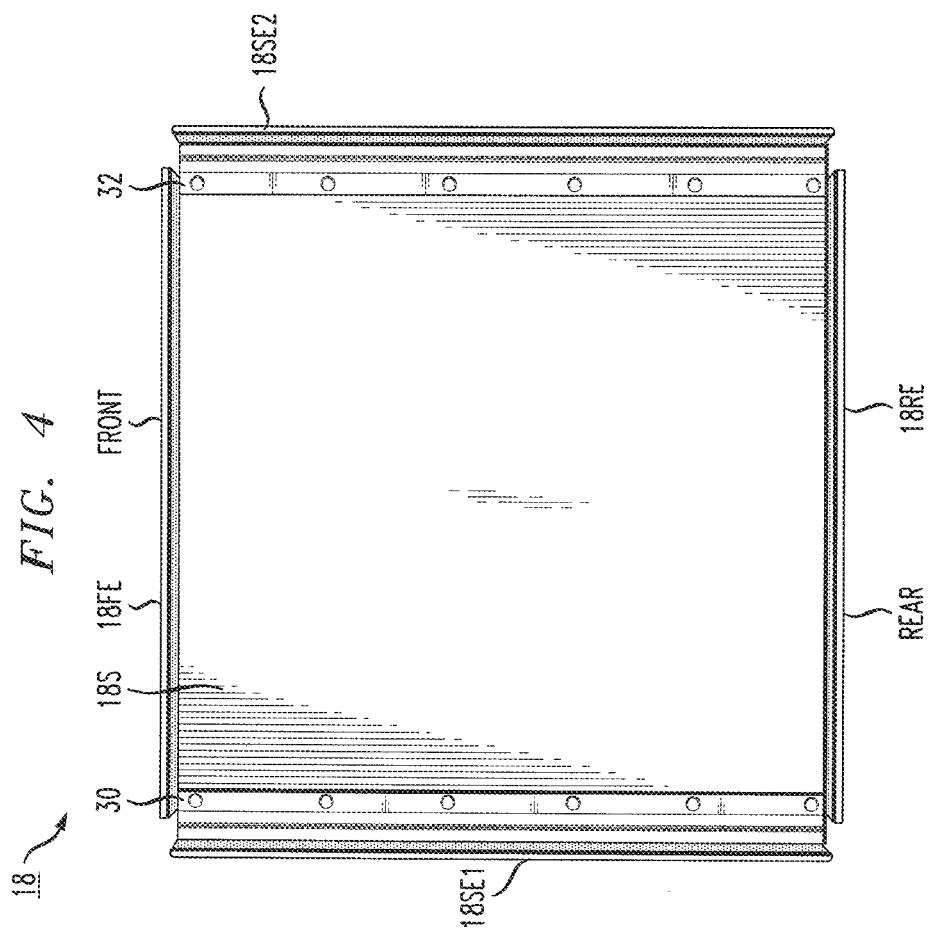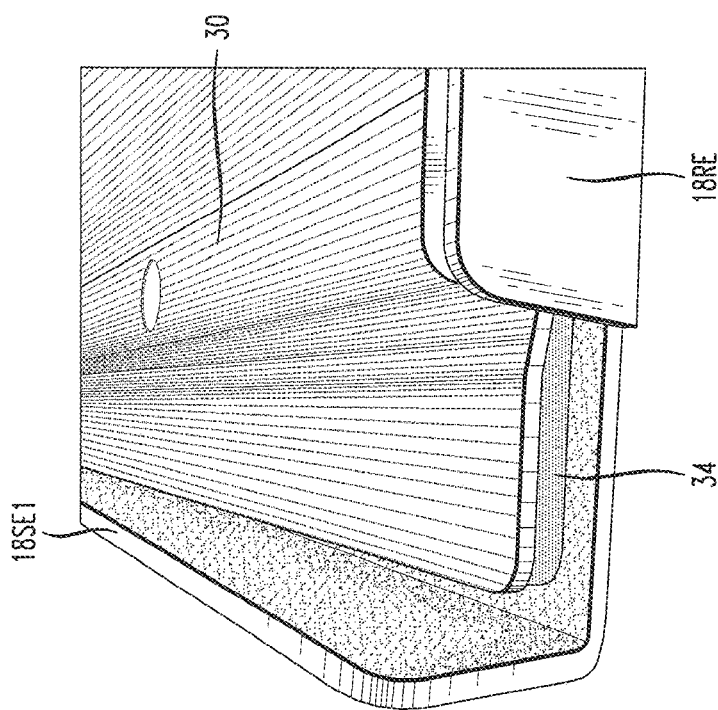

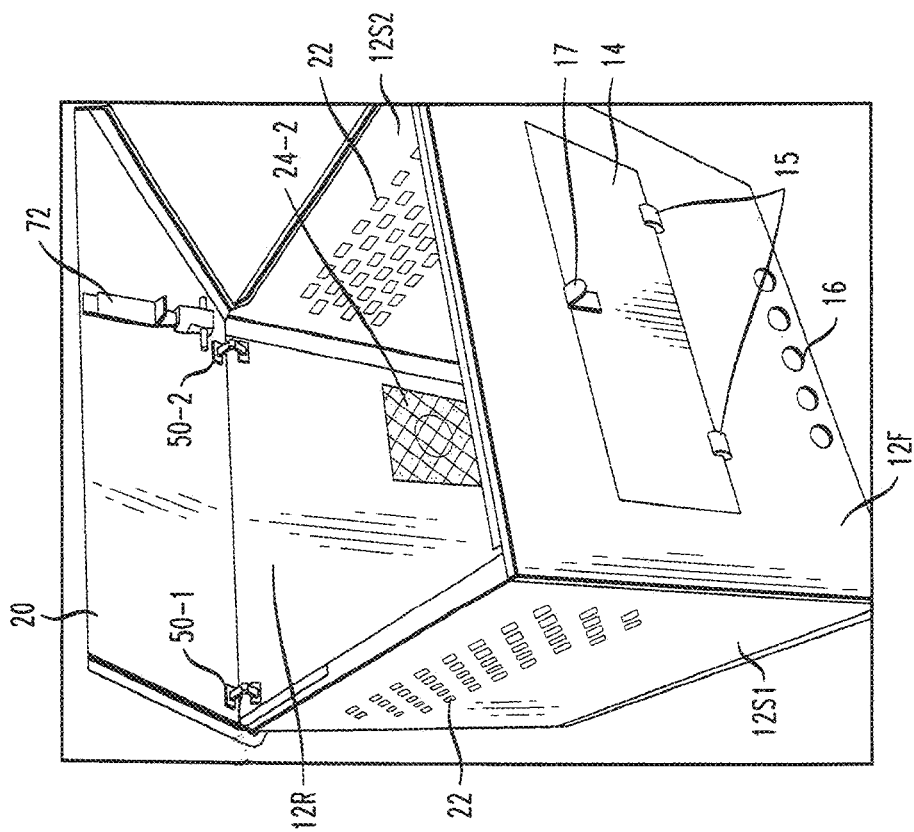
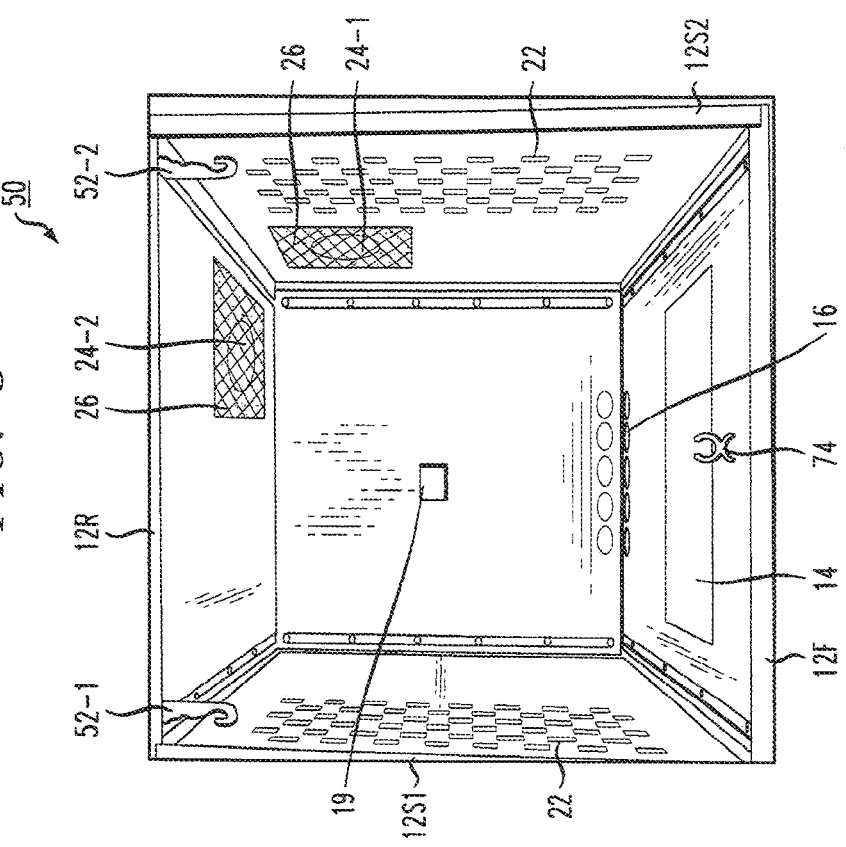

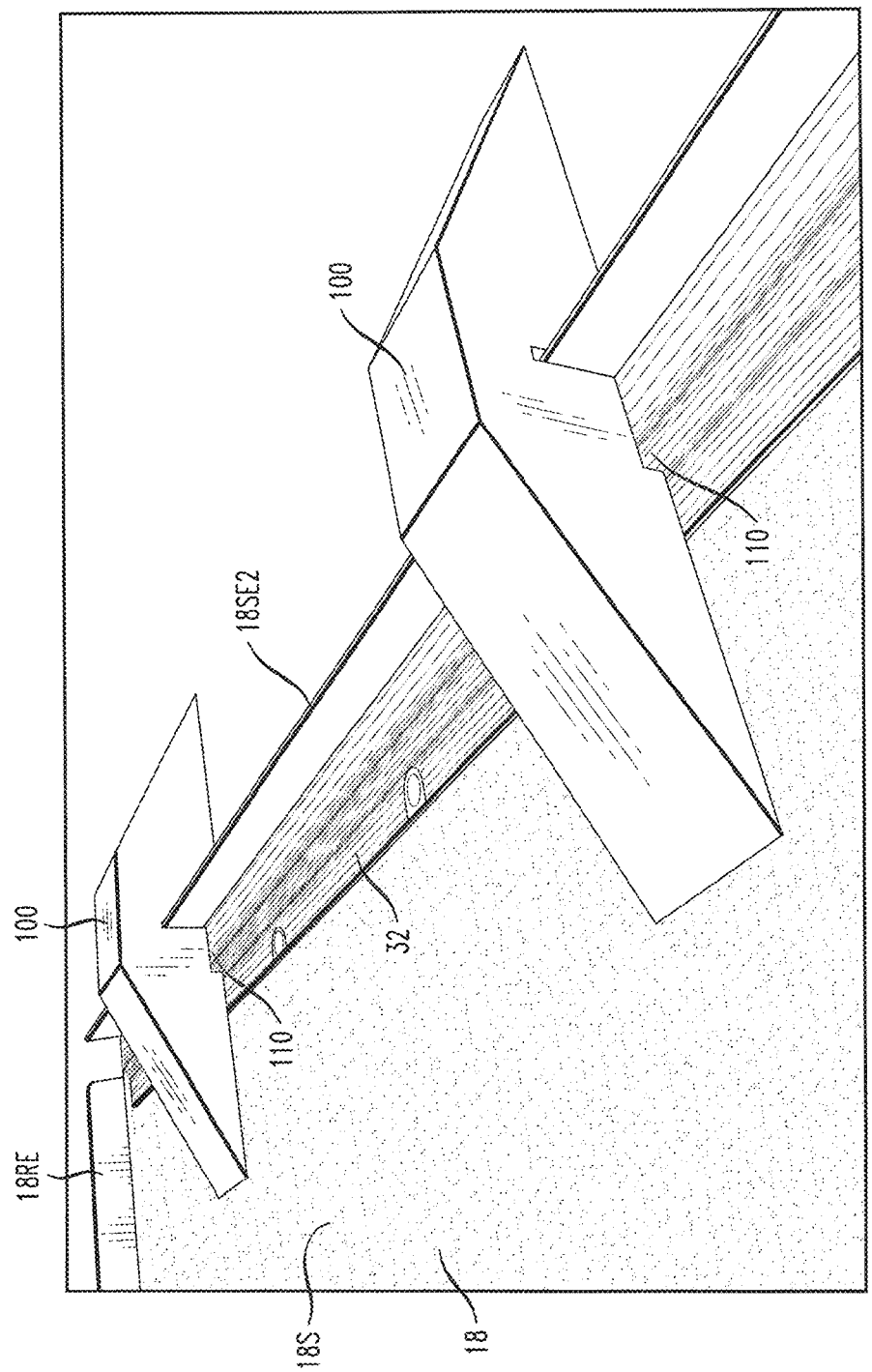

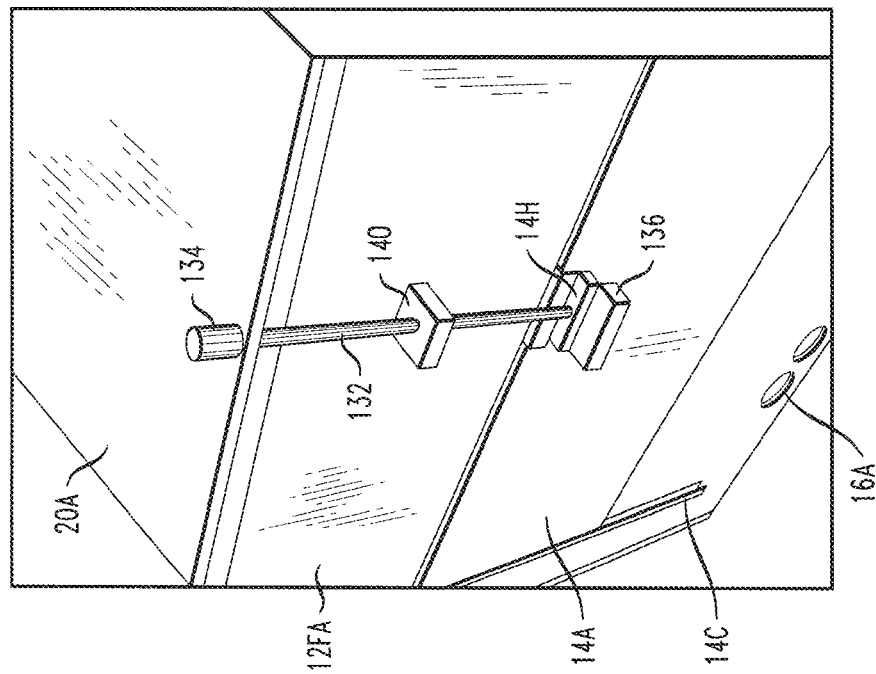
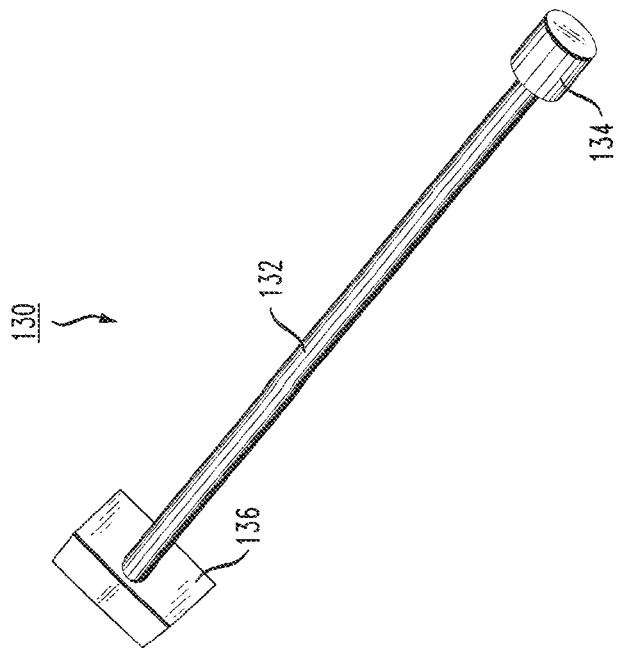

PORTABLE HOUSING FOR USE WITH PORTABLE ELECTRIC GENERATORS

CROSS-REFERENCE TO RELATED APPLICATIONS

This application claims the benefit of U.S. Provisional Application No. 63/045,065, filed Jun. 27, 2020 and herein incorporated by reference.

TECHNICAL FIELD

The present invention relates to a protective housing for a portable electric generator and, more particularly, to a housing formed of individual components that may be taken apart and stored as a set of two-dimensional walls when not in use, yet be sufficiently rigid and secure to protect a generator when used in an outdoor setting.

BACKGROUND OF THE INVENTION

In many places that experience severe weather, individual homeowners are encouraged to have an alternative source of energy available. For example, in regions that experience severe winter weather, the ability to have a generator to supply electricity for at least necessities is advisable. These generators are, for the most part, configured to operate on gasoline. Others are designed to run on diesel, or perhaps another fuel source.

In use, a generator needs to be located outdoors in order to prevent carbon monoxide to build up within the building plugged into the generator. As such, the generators are necessarily exposed to the inclement weather conditions that required the use of the generator in the first place. The exposure may affect the performance of the generator and, in any event, needs to remain cleared in order to work properly. Obviously, when put in use during "emergency" situations, it is more than likely that an exposed generator would be susceptible to damage by storm-related debris such as trees, building materials, and the like (including snow in the case of winter weather)

In the past, it has been suggested to provide a tent-like "canopy" that is positioned over the generator to protect it from damage by snow, debris, etc. In practice, this is a fundamentally unsound approach. Portable pop-up canopies are difficult to anchor (especially in frozen ground), they provide no protection to precipitation that is blowing in from an angular direction, they cannot withstand high-wind conditions, and they are susceptible to collapse under the weight of a moderate snow accumulation (or fallen tree limbs) on their exterior.

Moreover, the various types of portable generator protection offered to date do not inhibit the capability of unauthorized individuals from accessing a portable generator (to perhaps siphon fuel from the generator) or simply removing the generator from the owner's premises.

SUMMARY OF THE INVENTION

The needs remaining in the prior art are addressed by the present invention, which relates to a protective housing for a portable electric generator and, more particularly, to protecting housing formed of individual components that may be taken apart and stored as a set of two-dimensional walls when not in use, yet be sufficiently rigid and secure to protect a generator when used in an outdoor setting.

In accordance with the principles of the present invention, an exemplary protective housing is formed of a set wall panels, a base panel, and a lid panel that interlock to form the housing, but may also be taken apart and stored as a stack of two-dimensional panels when not in use. It is an aspect of the present invention that the various panels interlock via configurations internal to the housing itself, so that once an external lock is placed to secure an access door (formed in one wall panel) to the remainder of the housing, it is completely self-contained and impossible to dismantle or otherwise take apart the individual components of the housing from the outside.

The rear wall and a side wall of the inventive housing are formed to include exhaust locations for an included generator, thus requiring no additional ventilation system to be separately constructed and included. The walls themselves may be formed of any suitable material, including but not limited to steel, high density plastic, fiberglass, or other suitable rugged material appropriate for use in structures exposed to the environment.

In an exemplary embodiment, the base component may including a removable portion so that the inventive housing may be permanently installed at a particular location without requiring complete modification of the housing structure.

In a preferred embodiment where the lid, walls, and base are formed of machinable steel, the features used to create the interlocking structures between the components may be formed by machining a pattern in the initial stock material, and then bending the machined portion to create the desired structure (such as a channel). This particular aspect of the present invention will be addressed in detail below.

An exemplary embodiment of the present invention takes the form of a portable housing for securely enclosing a portable electric generator, where the portable housing comprises a base panel, side wall panels, front and rear wall panels, and a lid. The base panel is of rectangular form upon which a portable electric generator may be positioned and includes wall guiding channels formed around an interior perimeter thereof. The side wall panels comprise a pair of panels including interior wall guides sized to releasably engage with the base panel wall guiding channels as the pair of side wall panels are slid in place from front to back during placement on the base panel. The front wall panel is disposed on the base panel between the pair of side wall panels at a front interior edge of the base panel, the front wall panel including an access door and releasable interior latching means for coupling the front wall panel to the pair of side wall panels. The rear wall panel is disposed on the base panel at an interior rear edge thereof and positioned to releasably engage with the pair of side wall panels, the rear wall panel including releasable interior latching means for coupling the rear wall panel to the pair of side wall panels and an interior releasable hinge mechanism disposed proximate to a top edge of the rear wall panel. The lid panel is disposed over the combination of the pair of side wall panels, the front wall panel, and the rear wall panel in a manner where the lid panel is parallel to the base panel. The lid panel includes an interior hinge mechanism for releasably engaging with the rear wall panel interior releasable hinge mechanism as the lid panel is positioned in place to form the portable housing. Additionally, at least one of a side wall panel and the rear wall panel includes an exhaust vent for directing fumes produced by a portable electric generator away from the vicinity of the portable housing.

Other and further aspects and features of the present invention will become apparent during the course of the following discussion and by reference to the accompanying drawings.

BRIEF DESCRIPTION OF THE DRAWINGS

Referring now to the drawings, where like numerals present like parts in several views:

FIG. 4 is a top view of an exemplary base panel included as part of the portable housing formed in accordance with the principles of the present invention;

FIG. 5 is a close-up view of a portion of the base panel shown in FIG. 4, in this view illustrating a wall guide and edge portion of the base panel;

FIG. 8 is a perspective view looking down into the portable housing of the present invention prior to attaching the lid panel to the rear wall panel;

FIG. 9 is an isometric view of an exemplary embodiment of the inventive portable housing, in this case showing the lid panel in its "open" position;

FIG. 17 illustrates a pair of removable wheel ramps that may be used to facilitate the movement of an associated electric generator on to and off of the base panel of the portable housing;

FIG. 26 illustrates an exemplary locking bar mechanism that may be used in conjunction with this alternative embodiment of the present invention to secure the portable housing; and FIG. 27 shows the mechanism of FIG. 26 as functioning with the sliding access door to provide the secure locking configuration of the portable housing.

DETAILED DESCRIPTION

Figure 1:
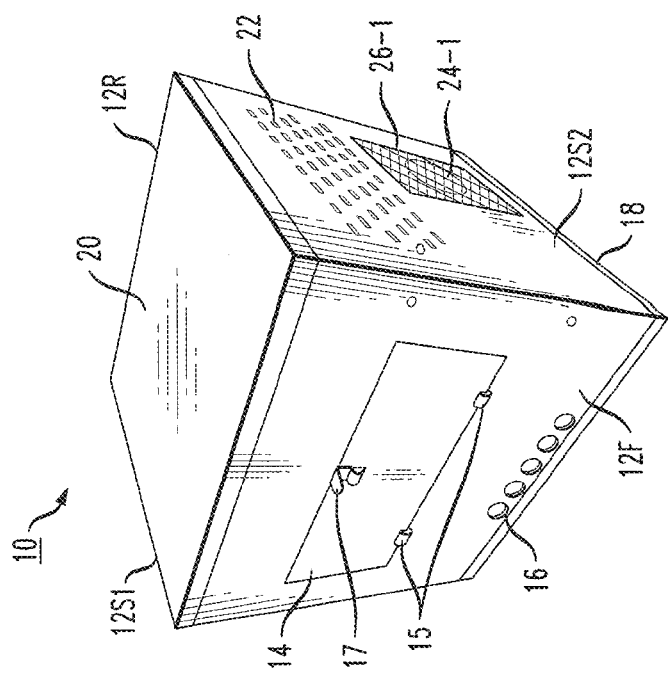
FIG. 1 is a first perspective view of an exemplary portable housing formed in accordance with the principles of the present invention.

FIG. 1 is a first perspective view of an exemplary housing 10 formed in accordance with the present invention. In the view of FIG. 1, a front wall 12F of housing 10 is particularly shown in detail. Front wall 12F includes an access door 14 that gives the user access to a portable electric generator positioned within the housing (not shown). Access door 14 may be hinged, or engage with a sliding mechanism so that it may be opened by the user to gain access to the generator positioned inside. In the view of FIG. 1, access door 14 is in its "closed" position, where in this particular embodiment a pair of hinges 15 are used to control the opening and closing of access door 14. A plurality of openings 16 in front wall 12F are included to provide access for the electrical cables (not shown) that will be plugged into the generator during use. Also shown in front wall 12F is a locking mechanism 17 that will be described in detail below.

Continuing with the description of FIG. 1, housing 10 further comprises a rear wall 12R and a pair of side walls 12S1 and 12S2. Also shown is a base component 18 and a lid 20, that are removably engaged with walls 12 in a manner described below to form protective housing 10. One aspect of this exemplary embodiment of the present invention is that lid 20 interlocks with front wall 12F (through a mating assembly formed on the interior of front wall 12F and the underside of lid 20, discussed in detail below in association with FIGS. 14 and 15). By virtue of locking lid 20 to front wall 12F via a mechanism that remains enclosed within the interior, unwanted individuals are prevented from gaining access to the generator.

In the view of FIG. 1, a side wall 12S2 is particularly shown, and illustrates the inclusion of a plurality of ventilation louvers 22 and a first exhaust vent 24-1. In a preferred embodiment, a protective screen 26-1 is incorporated with first exhaust vent 24-1 to maintain the structural integrity of housing 10 (i.e., block an entry point for intrusion), as well ensure that animals cannot enter and nest in the structure. For example, protective screen 26-1 may comprise a honeycomb structure that is machined into side wall 12S2 of housing 10. In the perspective view of FIG. 2, side wall 12S1 is visible, and in this particular embodiment is formed to also include ventilation louvers 22.

Figure 2:
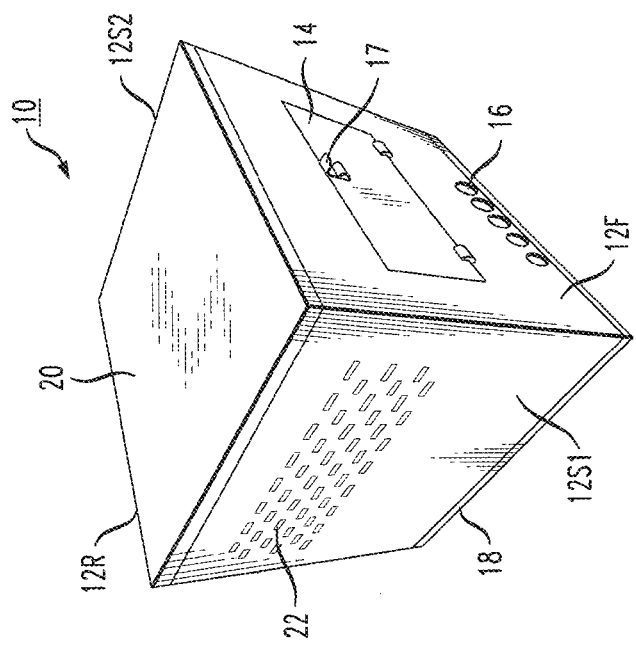
FIG. 2 is a second perspective view of the exemplary portable housing of FIG. 1.
Figure 3:
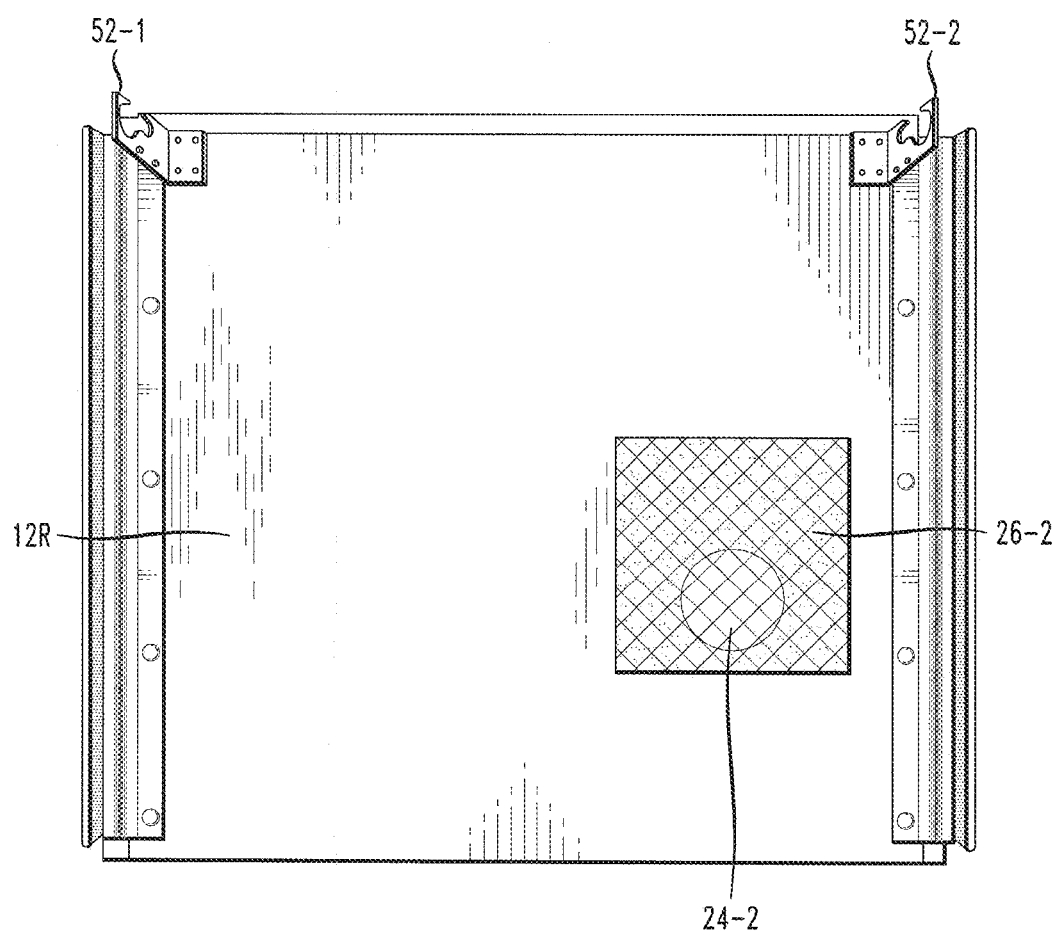
FIG. 3 is an interior view of a rear wall panel of the inventive portable housing.

FIG. 3 is a view of the interior of rear wall 12R, illustrating the inclusion of a second exhaust vent 24-2 (which is shown including a protective screen 26-2). As mentioned above, the inclusion of such a vent along the back wall is to provide for ease of use with specific generator designs that have their exhaust located along the back side of the unit. It is to be understood that an exemplary embodiment of the present invention may be configured to have an exhaust vent along only a side wall, only a rear wall, or both a side wall and the rear wall. An advantage of the inventive protective housing as comprising a plurality of flat panels that are engaged within one another is that a user can "switch out" one or more panels, as the case may be, to ensure that the assembled configuration will work with his/her particular generator. For example, a homeowner may have a generator with a rear exhaust position, and would thus utilize an arrangement with the exhaust located on rear wall 12R (and perhaps a "solid" side wall 12S2). If another generator were later purchased, and it had a "side" exhaust location, the homeowner would only need to purchase a single side wall component, and not a completely new protective housing. It is to be understood that while the views of FIGS. 1-3 show the formation of an exhaust vent 24 on rear wall 12R or side wall 12S2, an exhaust vent may be formed along any wall (and at any height) that permits for easy alignment of a portable generator's exhaust system to the inventive portable housing.

Also shown in FIG. 3 is a pair of hinge hooks 52-1, 52-2, which comprise a portion of hinge mechanism 50 and are used to provide attachment of lid 20 to rear wall 12R in a manner discussed below in association with FIGS. 10-14.

It is contemplated that housing 10 is formed of a rugged material, such as a high density plastic or metal (for example, steel); various other materials may also be used. An aspect of the housing of the present invention is that all of the panels slide together (or otherwise interlock) in a manner that protects the enclosed generator. All of the elements used to join the panels together are located within the interior of the housing, so that once all of the panels are in place and the exterior padlock is secured, the generator is protected from being accessed by untoward individuals.

It is preferred that lid panel 20 may be somewhat larger in dimension that the top opening of housing 10, taking the form of a "shoe box lid", for example, where this shoebox lid design of lid 20 allows for it to overhang all of the vertical walls, protecting the walls from water, snow, debris, etc.

As will be evident in following discussion, rear wall 12R and side walls 12S1, 12S2 are formed to include wall guides and tabs that mate with similar structures formed in base panel 18 and lid panel 20 in a manner that allows for both ease of assembly and ease of "breaking down" housing 10 into flat component panels for storage purposes.

FIG. 4 is a top view of base panel 18, looking down on the top surface 18S where a portable electric generator will be placed. In accordance with this embodiment of the present invention, side edges 18SE1 and 18SE2 are bent to be at 90° with respect to top surface 18S, with a rear edge 18RE and front edge 18FE formed to exhibit the same structure. These side edges are used to prevent movement of the various vertical walls as they are slid into position. Also shown in FIG. 4 is a pair of wall guides 30, 32. Wall guides 30, 32 are attached to base 18 and positioned to be parallel to side wall edges 18SE1 and 18SE2, respectively, with enough of a space between the edges and the guides that the various vertical walls may be slid in (from front to back for side walls 12S1, 12S2) in a manner that engages the side walls and holds them in place.

FIG. 5 is a close-up perspective view of wall guide 30 and up-turned side edge 18SE1. As shown in FIG. 5, the physical design of wall guide 30 is used to form a channel region 34 (slot) between the underside of wall guide 30 and top surface 18S of base 18. As will become apparent during a discussion of side walls 18S1, 18S2, the structure of wall guide 30 allows for the side walls to slide in place, with edge 18SE1 ensuring that these side walls remain firmly in place within the interior of protective housing 10.

It is particularly clear from the illustration of FIG. 4 that side wall panels 12S1 and 12S2 would be initially positioned to contact base panel 18 and engage with slots 34, with each side wall then slid from front to back, allowing for the lower edges of side walls 12S1 and 12S2 to fully engage with wall guides 30. Stops included at the rear of base panel 18 prevent side walls 12S1, 12S2 from "overshooting" their proper position, while also maintaining the vertical (plumb) positioning of the walls, as required to form the final "aligned" structure with the front and rear walls (that is, proper 90° corners where the walls join).

Figure 6:
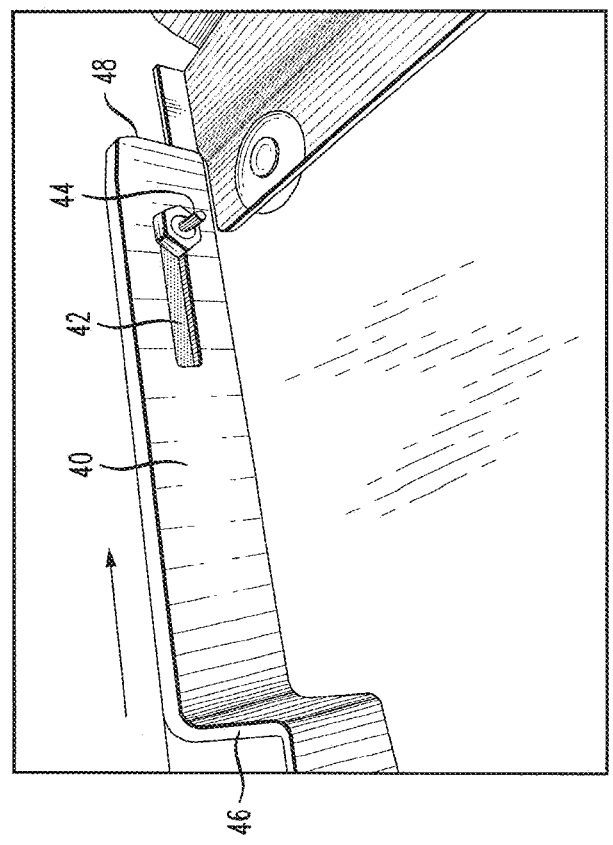
FIG. 6 is a view from the interior of the rear wall panel, illustrating an exemplary interior locking slide mechanism used for securing the rear wall panel to a side wall panel.

Front wall 12F and rear wall 12R are positioned into place between the opposing panels 12S1, 12S2, with a suitable mechanism used to removably attach these walls in place. FIG. 6 is a view from the interior of rear wall 12R, illustrating a locking slide 40 disposed at a top corner location of the wall. As shown, locking slide 40 includes a slot 42, with a pin 44 attached to the wall itself passing through slot 42. The illustration of FIG. 6 shows locking slide 40 in the "open" position. To close/lock the walls together, the user moves slide 40 in the direction shown by the arrow. A rounded edge 46 may be disposed along an end portion of locking slide 40 to facilitate its movement, giving the user a surface to easily grab on to.

Figure 7:
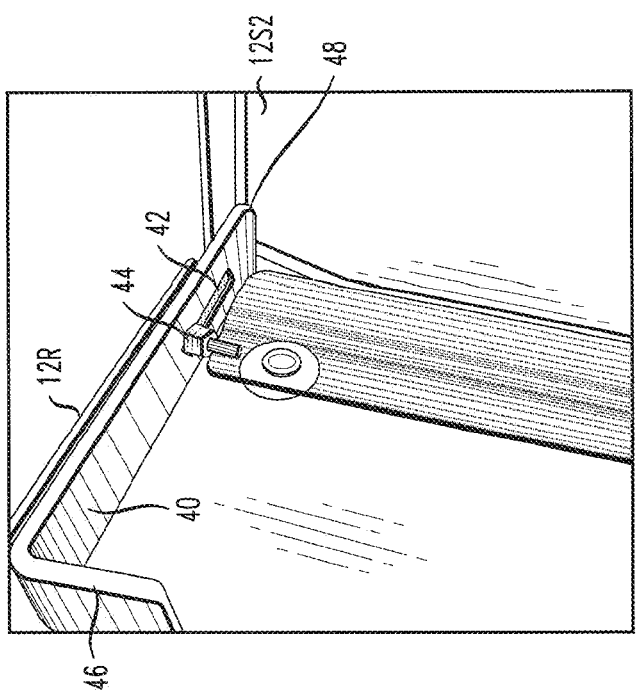
FIG. 7 shows the same configuration as FIG. 6, in this case with the slide moved into its "closed" position.

As locking slide 40 moves from its "open" to "closed" position, as shown in the view of FIG. 7, pin 44 contacts the opposing end of slot 42, and end region 48 of locking slide 40 will be completely covered by the "folded" end of side wall 12S2. Similar locking slides are disposed at each interior corner location, insuring that both front wall 12F and rear wall 12R are securely attached to side walls 12S1, 12S2. Again, it is noted that the complete mechanism utilized to connect the front and back walls to the side walls are fully contained within the interior of housing 10, substantially reducing the opportunity for unauthorized persons to gain access to the enclosed generator.

FIG. 8 is a view looking down into the assembly of protective housing 10 once all of the walls are in place (i.e., prior to the attachment of lid 20 to rear wall 12R via a hinge mechanism 50 described below). The inclusion of both a side exhaust vent 24-1 and a rear exhaust vent 24-2 are evident in this view. Also shown is a knock-out plate 19 that may be formed in a central region of base 18. While considered optional, if knock-out plate 19 is included, a homeowner is able to remove plate 19 and form a more permanent attachment of the remaining elements of housing 10 to an outdoor area properly prepared for the placement of a generator. Also shown in this view is the pair of hinge hooks 52-1, 52-2 that form part of hinge mechanism 50 that attaches lid 20 to the enclosure (discussed below in association with FIGS. 11-14). A ball lock 74 is shown as positioned along the interior of front wall 12F, so as to be centrally located and disposed above access door 14. The use of ball lock 74 to secure lid 20 to front wall 12F will be discussed below in association with FIGS. 15 and 16.

Figure 10:
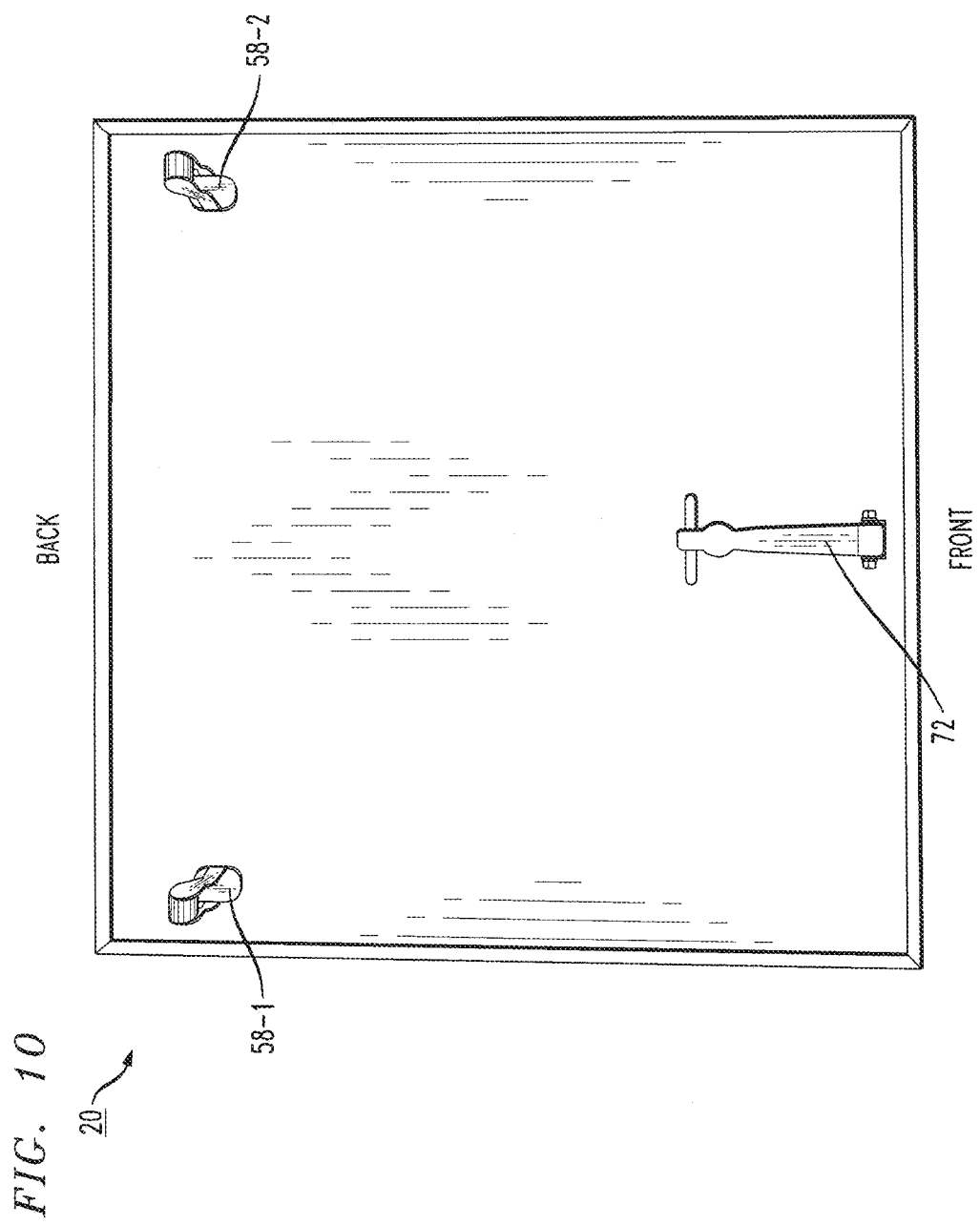
FIG. 10 is an interior view of an exemplary lid panel, illustrating the positioning of a portion of the hinge mechanism (i.e., the hinge knobs) used for securing the lid panel to the rear wall, and a portion of the security . . . (i.e., the strap) used for securing the lid panel to the front wall.

As mentioned above, lid panel 20 is formed as a hinged member that may be opened and closed, as need be, to introduce fuel to the enclosed portable electric generator. FIG. 9 illustrates lid panel 20 in its "open" position, with a pair of lid hinge mechanisms 50-1, 50-2 shown as used to engage lid 20 with rear wall 12R. FIG. 10 is a view of the underside of lid panel 20, showing the position of a pair of hinge knobs 58-1, 58-2 that will mate with hinge hooks 52-1, 52-2 in the manner described below in association with FIGS. 11-14. Also shown in FIG. 10 is a strap 72, where strap 72 forms part of securing strap configuration 70 and mates with ball lock 74 in a manner described below to secure the front edge of lid panel 20 to front wall panel 12F.

Continuing with the description of a configuration for removably attaching lid panel 20 to the vertical wall panels of housing 10, hinge mechanism 50 is used, as mentioned above, to attach a rear portion of lid panel 20 to rear wall panel 12R. In particular, a pair of hinge mechanisms 50-1, 50-2 is preferably used, each located near a corner where the lid meets a side wall panel 12S. An exemplary hinge mechanism 50 includes a hinge hook 52 attached at an appropriate location to the interior of rear wall 12R, as shown in an enlarged illustration of a portion of rear wall 12R in FIG. 11 (and also illustrated in FIGS. 3 and 8). With continued reference to FIG. 11, hinge hook 52 is shown as including a pair of arcuate supports 54, 56. Support 54 (referred to at times as "cradle 54" is used to initially support an associated hinge knob 58 formed on the underside of lid 20 (as shown in FIG. 10 and discussed below in association with FIG. 12). Support 56 (referred to at times as "lock 56") fully holds the associated hinge knob 58 in a manner such that lid 20 cannot be raised.

Figure 12:
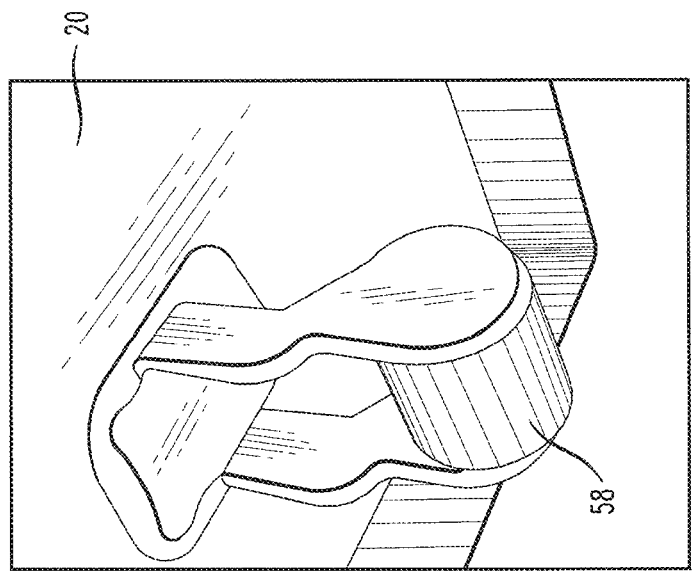
FIG. 12 is a close-up view of the underside of the lid panel, showing the location of a hinge knob that engages with the hinge hook illustrated in FIG. 10.
Figure 11:
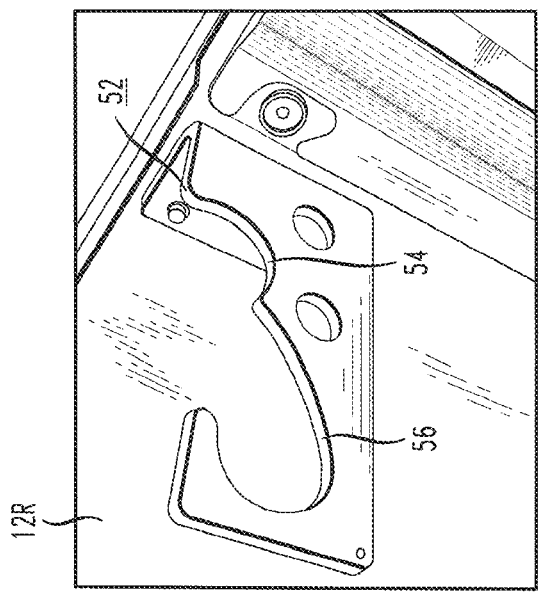
FIG. 11 is an illustration of an enlarged portion of the rear wall panel, showing in particular an exemplary hinge hook mechanism used for engaging with the lid panel.
Figure 14:
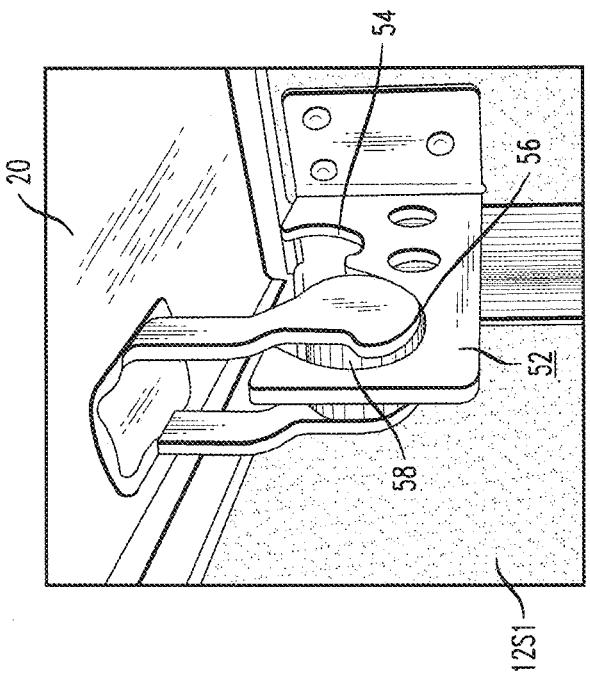
FIG. 14 illustrates the hinge knob in its final "locked" position on the associated hinge hook.
Figure 13:
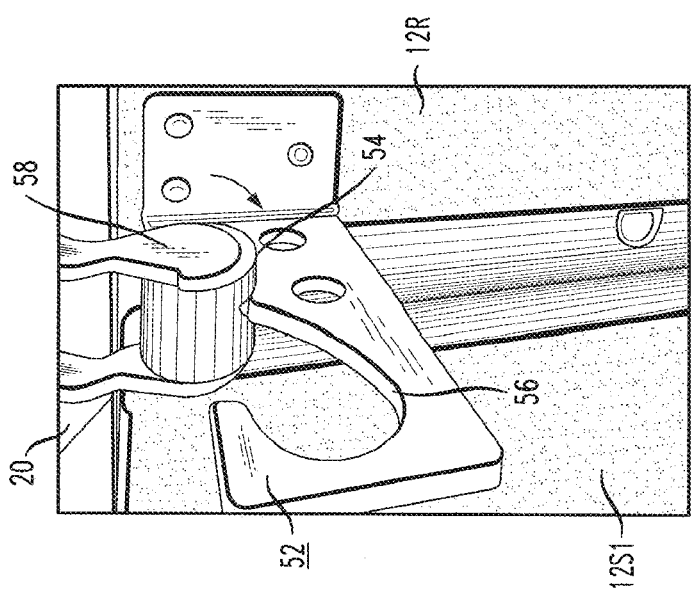
FIG. 13 illustrates the initial placement of a hinge knob on a cradle portion of its associated hinge hook.

FIG. 12 is a close-up view of a portion of the underside of lid 20, showing the location of a hinge knob 58 that engages with hinge hook 52 when lid 20 is positioned in place over the assembled side wall panels (and base), such as the configuration shown in FIG. 8. FIG. 13 illustrates an initial placement of hinge knob 58 in position on cradle 54, such that lid 20 is in an initial engagement position with respect to rear wall 12R. To complete the engagement, hinge knob 58 slides forward, as shown by the arrow in FIG. 13, resulting in the final arrangement of hinge knob 58 fixed in place within lock support 56, as shown in FIG. 14.

It is to be understood that at least one more hinge mechanism 50 is included to join together lid 20 and rear wall 12R (illustrated as hinge mechanisms 50-1, 50-2 in FIG. 9). Additional hinge mechanisms may be disposed along the extent of the rear structure between mechanisms 50-1 and 50-2, if desired. For most purposes, two hinge mechanisms are sufficient.

Moreover, inasmuch as hinge hooks 52 are the only structural components of protective housing 10 that are raised out of the plane of the two-dimensional panels, it is possible to form these as collapsible members that fold against the surface of rear wall 12R for storage purposes.

In accordance with the teachings of the present invention, all of the mechanisms used to interlock and attach the various panels are formed in the interior region of housing 10. As will be described now below, housing 10 is further configured to "latch" lid 20 to front wall 12F with a securing strap configuration 70. An external padlock 17 is then used to lock access door 14 to front wall 12F so as to prevent unauthorized individuals from dismantling the housing and gaining access to the generator.

Figure 15:
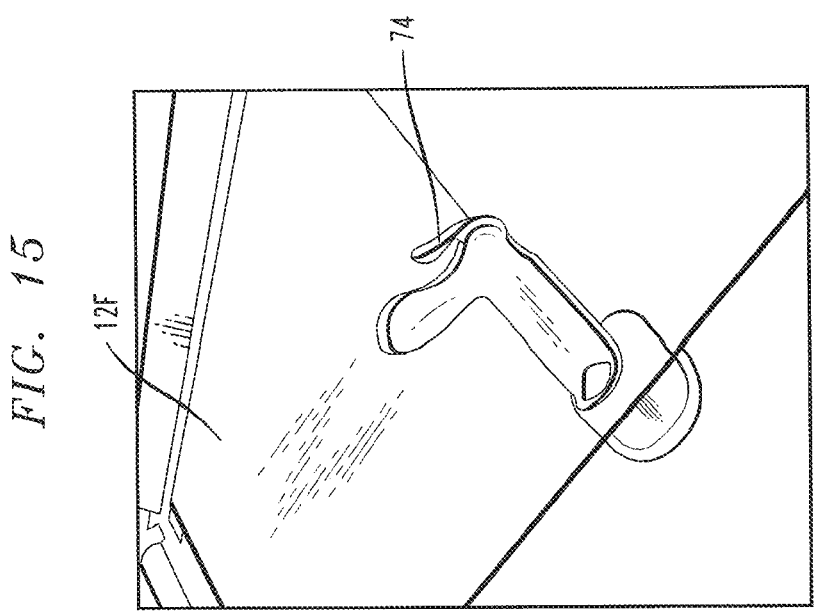
FIG. 15 is a view of an interior portion of an exemplary front wall panel, showing the location of a ball lock used to secure the lid panel to the front wall panel.

Referring back to FIGS. 9 and 10, a portion of a securing strap configuration 70, in particular, strap 72, is shown as extending downward from a position near the center front of lid 20. A ball lock 74, which captures and secures strap 72, is formed on the interior of front wall 12F immediately above access door 14, as mentioned above in association with the description of FIG. 8. FIG. 15 illustrates a portion of the interior of front wall 12F, with ball lock 74 attached at the location shown.

Figure 16:
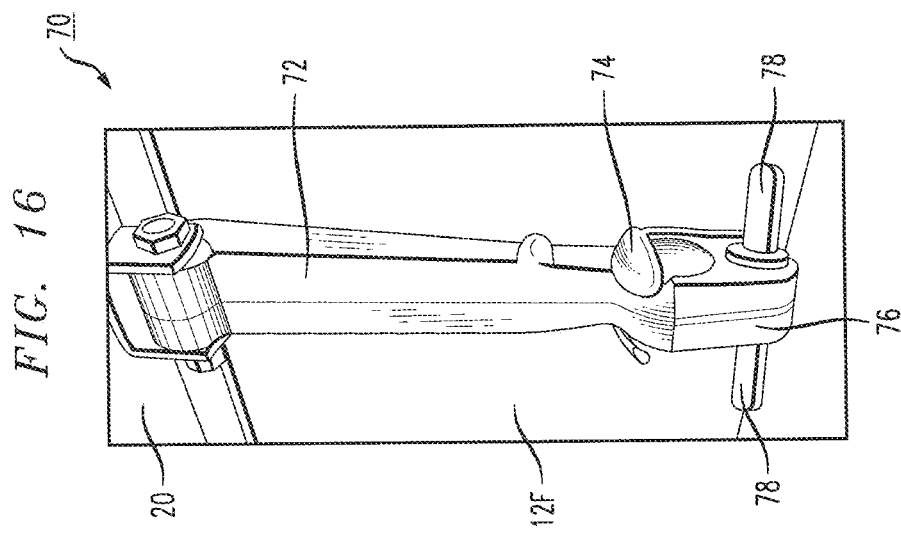
FIG. 16 shows a securing strap (attached to the underside of the lid) in position within the ball lock shown in FIG. 14, so as to secure the lid to the front wall panel.

In accordance with the principles of the present invention, strap 72 engages with ball lock 74 so that lid 20 remains fixedly in place, and cannot be opened other than by the homeowner (or other responsible individual) who has a key for the exterior padlock 17 on housing 10. In order to securely attach lid 20 to front wall 12F, access door 14 is opened by the user, who reaches in and grasps strap 72, pulling it down and forward to engage with ball lock 74. FIG. 16 illustrates securing strap configuration 70, showing strap 72 positioned in place within ball lock 74. In this particular embodiment, strap 72 is formed to include a contoured, enlarged end portion 76 (to ensure that strap 72 remains engaged with ball lock 74). A pair of handles 78 are shown as disposed on either side of end portion 76, and are provided to give the user an easy way to grab onto and position strap 72.

FIG. 17 shows, in close-up view, an additional feature that may be used with base panel 18 to assist in the movement of a generator into housing 10. As shown, this feature takes the form of a pair of wheel ramps 100 that are formed to (temporarily) engage with a turned-upward side edge of base 10 (for example, side edge 18SE2). Wheel ramps 100 are shown as including a notched cut-out 110 that is formed to extend beyond wall guide 32 (or wall guide 30, if using the other side of base 18 to place the generator). Notched cut-out 110 functions to distribute the force of the generator passing over wheel ramps 100, and prevents any direct force to be applied to wall guide 32 (which might damage the positioning of wall guide 32 and the gap created for slot 34 underneath). Wheel ramps 100 also facilitate the actual movement of the generator, which may be relatively heavy and difficult for some people to maneuver.

While the configuration of the present invention discussed above in association with FIGS. 1-17 may be considered as a preferred embodiment of the present invention, it is to be understood that various other specific features and arrangements may be used to provide the removable attachment of the vertical walls to the base, as well as for the lid to the structure. As long as the mechanisms used to form the protective housing utilize an interior means for removably attaching the various panels to each other, the essence of the protective housing itself is considered to fall within the scope of the present invention.

For example, alternative arrangements may be used to engage the walls with the base, and to "lock" the protective housing to prevent untoward individuals from gaining access to the generator.

Figure 18:
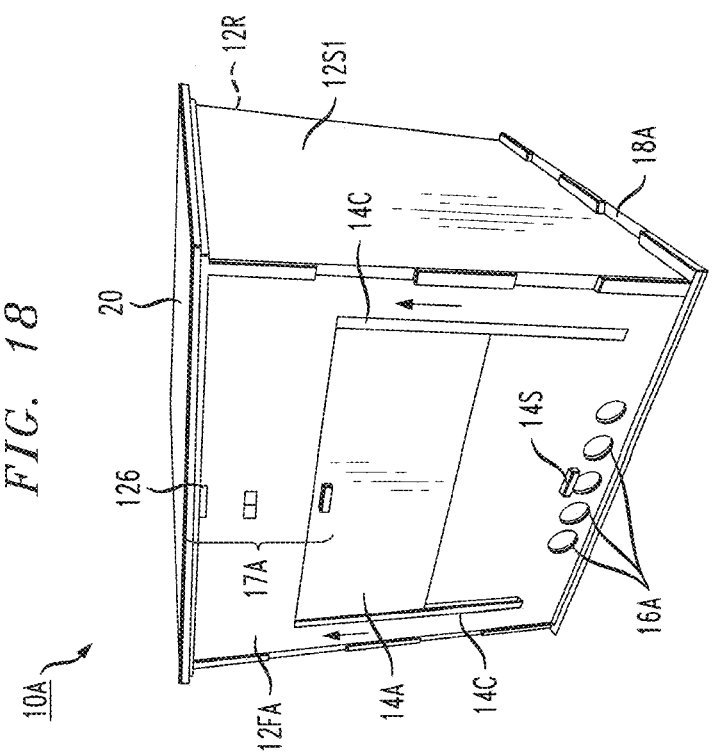
FIG. 18 is a first perspective view of an alternative embodiment of the present invention, in this case including a sliding access door component.

FIG. 18 is a first perspective view of alternative embodiment of a protective housing 10A accordance with the present invention. In the view of FIG. 18, a front wall 12FA of housing 10A is particularly shown in detail. Front wall 12FA includes an access door 14A that specifically takes the form of a sliding door, again giving the user access to the generator positioned within the housing in the same manner as discussed above. A plurality of openings 16A in front wall 12FA are included to provide access for the electrical cables (not shown) that will be plugged into the generator during use. Also shown in front wall 12FA is a lid-locking mechanism 17A that will be described in detail below. In the view of FIG. 18, sliding door 14A is raised into its "closed" position. One aspect of protecting housing 10A formed in accordance with the present invention is that sliding door 14A may be locked directly to the lid of the housing to prevent unwanted individuals from gaining access to the generator.

Figure 19:
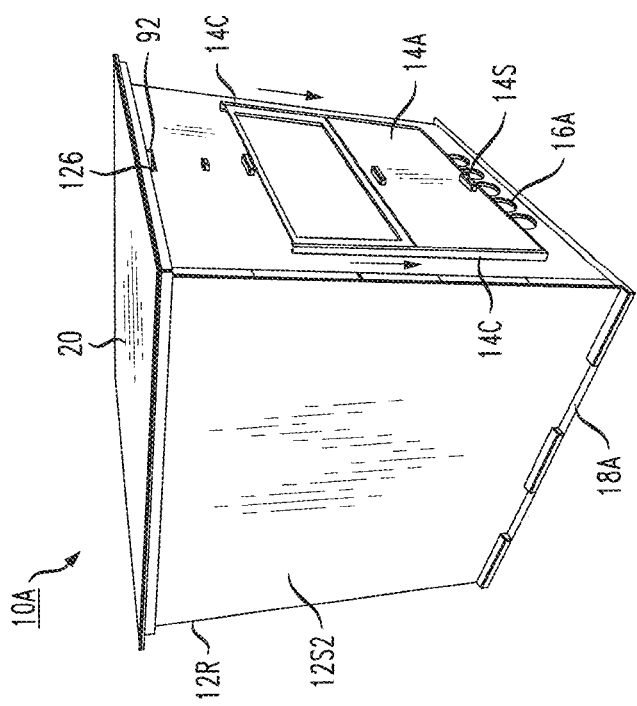
FIG. 19 is another perspective view of the alternative embodiment, in this case showing the sliding access door in its open position.

In the perspective view of FIG. 19, sliding door 14A is lowered into its "open" position, allowing the user access to the generator enclosed within housing 10A. Easy access to the enclosed generator (by proper individuals) is advantageous so as to quickly and easily turn the generator "on" and "off". Access through sliding door 14A is also used to plug the various cables fed through openings 16A to the generator itself. Also shown in FIGS. 18 and 19 is a pair of channels 14C that are used to control the movement (up and down) of sliding door 14A. A "stop" 14S is shown as disposed above openings 16A and used to prevent sliding door 14A from covering openings 16A when the door is in the open position. It is to be understood that while not explicitly illustrated in the views of FIGS. 18 and 19, alternative protective housing 10A is formed to include ventilation louvers and exhaust vent(s) (with protective screens) as discussed above in association with protective housing 10.

Figure 21:
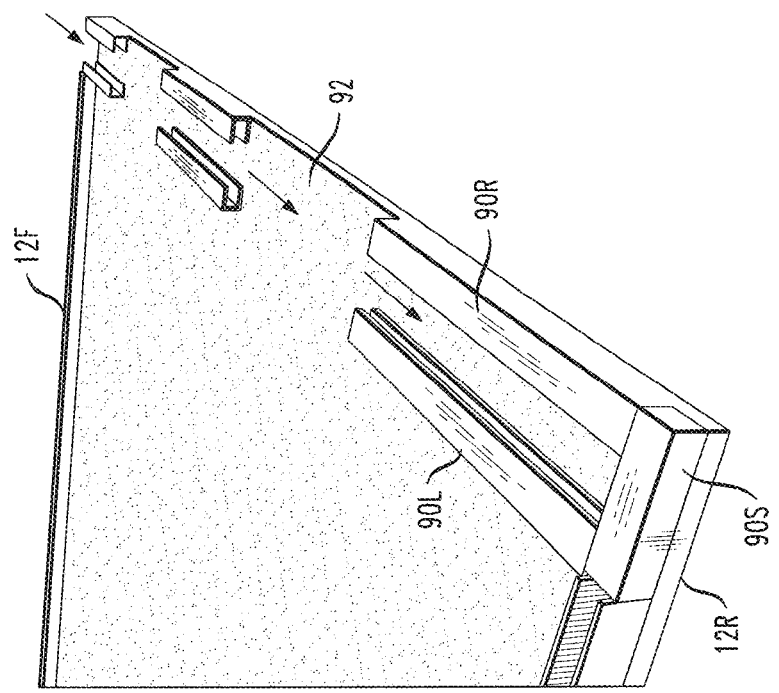
FIG. 21 illustrates an exemplary pair of "left" and "right" channel guides for assisting in the engagement of the side wall panels to the base panel.
Figure 20:
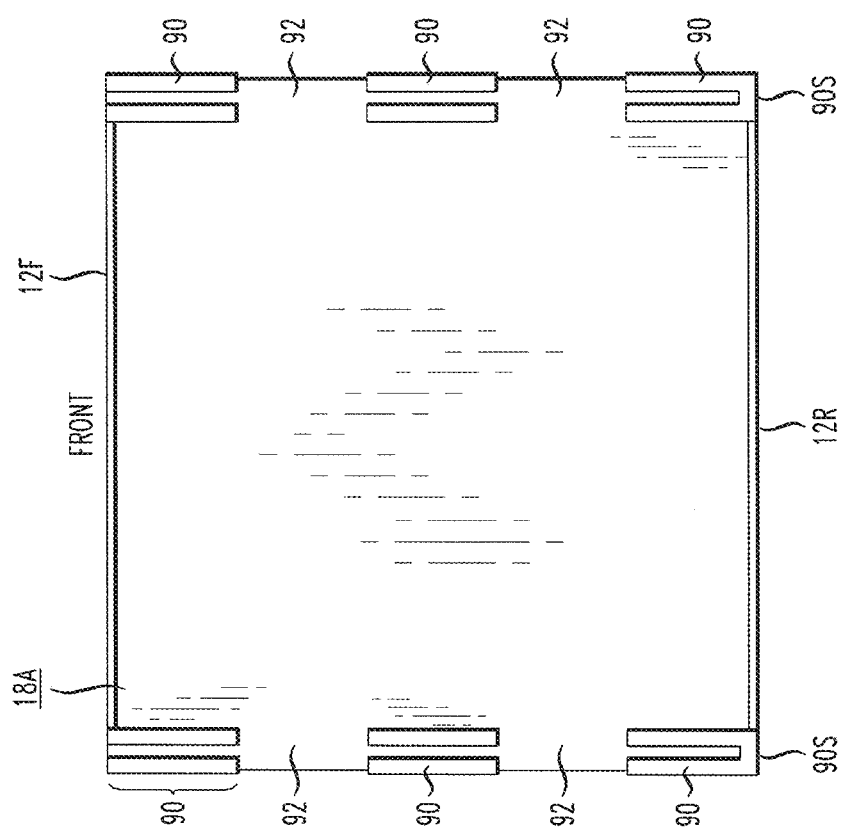
FIG. 20 is a top view of the alternative embodiment of a base panel, showing a plurality of wall guides and gaps used to facilitate the engagement of the side wall panels to the base panel.

FIG. 20 is a top view of base panel 18A of this alternative embodiment protective housing 10A of the present invention, showing the plurality of wall guides 90 (and associated gaps 92) used in this exemplary embodiment to facilitate the attachment of sidewalls 12S1 and 12S2. FIG. 21 is a close-up perspective view of one set of wall guides 90 (and gaps 92), where the rear of housing 10A is closest to the point of view and the front of housing 10A is shown in the distance. It is particularly clear from the illustration of FIG. 21 that wall panels 12S1 and 12S2 would be initially positioned to contact base panel 18A in gap areas 92, with each wall then slid from front to back, allowing for the lower edges of panels 12S1 and 12S2 to fully engage with wall guides 90. Evident in the view of FIGS. 20 and 21 is the inclusion of stops 90S at the rear terminations of wall guides 30, used to prevent the walls from sliding out from the rear of the housing.

In this particular embodiment, wall guides are formed as a channel guide, shown in FIG. 21 as including a left channel guide 90L and a right channel guide 90R, with sidewalls 12S1 and 12S2 (not shown) formed to exhibit T-shaped lower edge terminations that contact base 18A in gap areas 92, with panels 12S1, 12S2 then slid rearward to "lock" in place.

Figure 22:
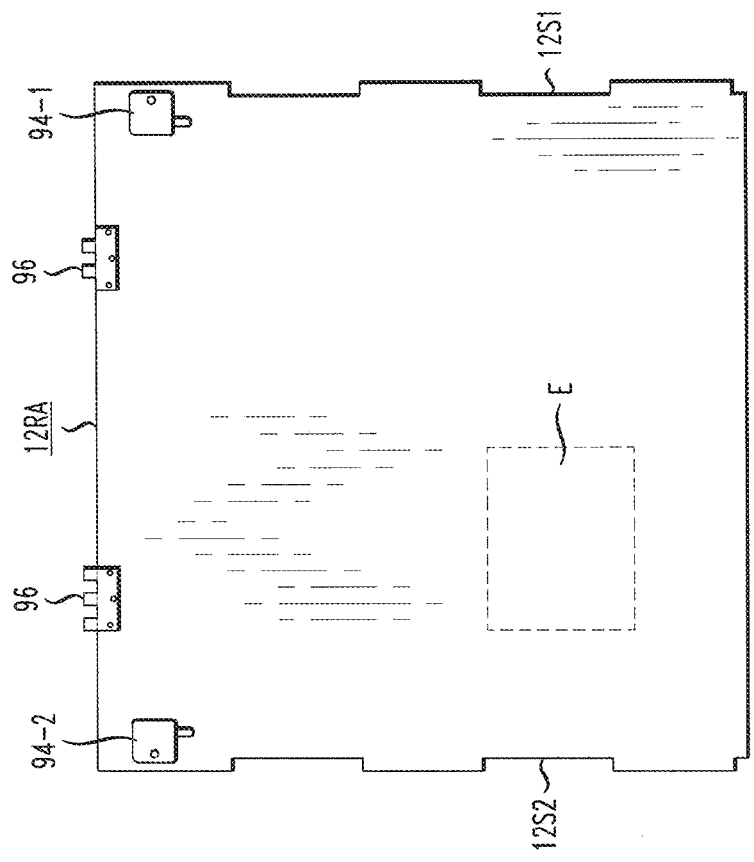
FIG. 22 is a view from the interior of the alternative rear wall panel configuration, illustrating the latching mechanism used in conjunction with this alternative embodiment.

Front wall 12FA and rear wall 12RA are positioned into place between the opposing panels 12S1, 12S2, with a suitable latching mechanism used to removably attach these walls in place. FIG. 22 is a view from the interior of rear wall 12R, illustrating a pair of latching mechanisms 94-1 and 94-2 disposed at opposing edge regions of the interior. Latching mechanisms 94-1 and 94-2 will engage with similar mechanisms formed in the interior of sidewall panels 12S1 and 12S2, respectively. The specific configuration of rear wall 12RA is shown including indented portions that will mate with matching regions on the sidewalls panels and provide further structural integrity for housing 10A. For reference, FIG. 18 illustrates the interlocking arrangement of front wall 12FA and side panel 12S1, where the "fingers" interleave to create a sturdy structure. Also shown in FIG. 22 is a pair of hinges 96, that are attached to a top portion of rear wall 12RA and used with lid 20A (as described below) to allow for the lid to be raised to add fuel to the housed portable electric generator, and then closed (and locked).

Figure 23:
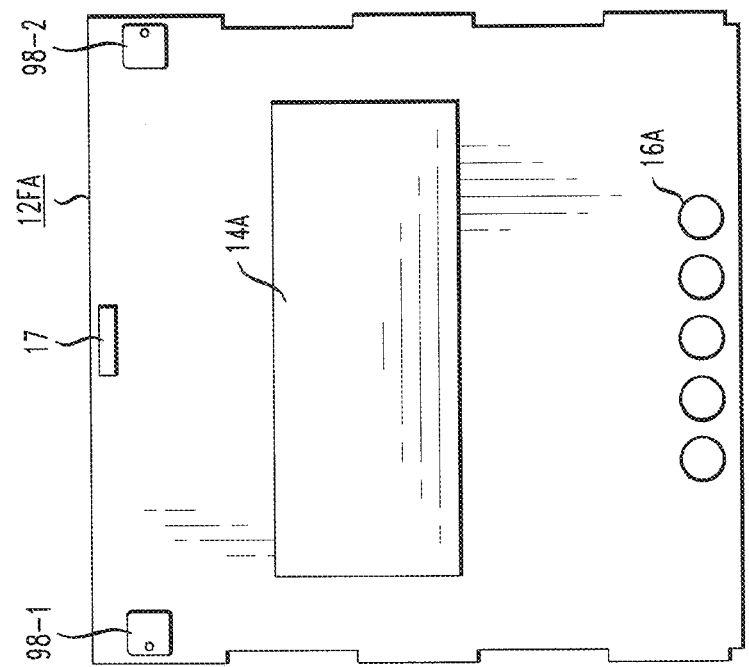
FIG. 23 is an interior view of the alternative front wall panel, showing the locking mechanisms used to attach the front wall panel to the side wall panels.

FIG. 23 is a view of the interior of front wall 12FA, particularly illustrating a pair of locking mechanisms 98-1, 98-2 (similar to those on rear wall 12RA) used to releasably attach front wall 12FA to sidewall panels 12S1 and 12S2. Again, the edges of front wall 12FA are formed to include indented portions that mate with similar structures formed on the side panels to provide additional structural support.

In accordance with the teachings of the present invention, all of the mechanisms used to interlock and attach the various panels are formed in the interior region of housing 10, 10A. As will be described now below, alternative embodiment protective housing 10A is further configured to "latch" lid 20A to front wall 12FA, with the arrangement then padlocked together to prevent unauthorized individuals from dismantling the housing and gaining access to the generator.

Figure 24:
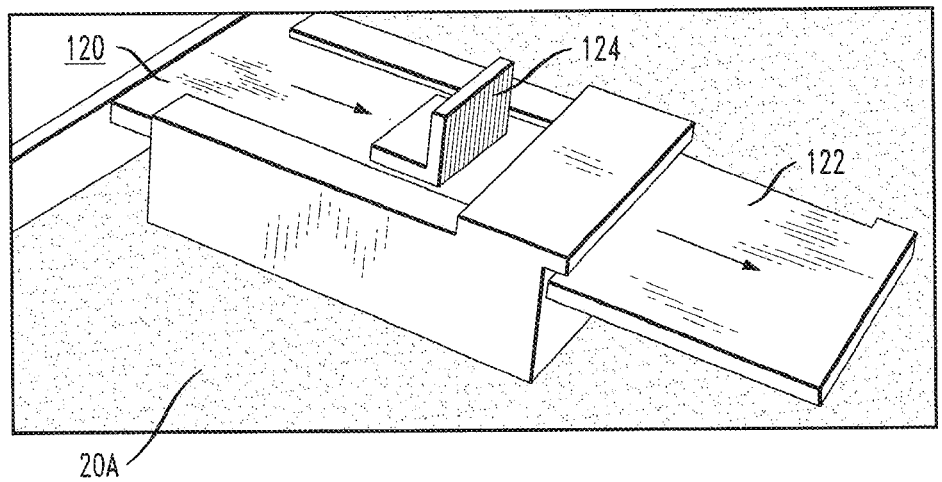
FIG. 24 illustrates an exemplary latching mechanism that may be used with the lid and front wall panel of this alternative embodiment of the present invention.

FIG. 24 illustrates one exemplary latching mechanism 120 that may be formed on lid 20A to engage with front panel 12FA, thereby holding lid 20A securely in place. As shown, latching mechanism 120 includes a tab 122 that moves back and forth via an attached slide 124. When fully extended, tab 122 extends through an aperture 126 formed in front wall 12FA (see FIGS. 18 and 19). It is to be understood that this particular closing mechanism is exemplary only, and many other arrangements may be used to provide engagement of lid 20A with housing 10A, including those discussed above with the preferred embodiment of protective housing 10.

Figure 25:
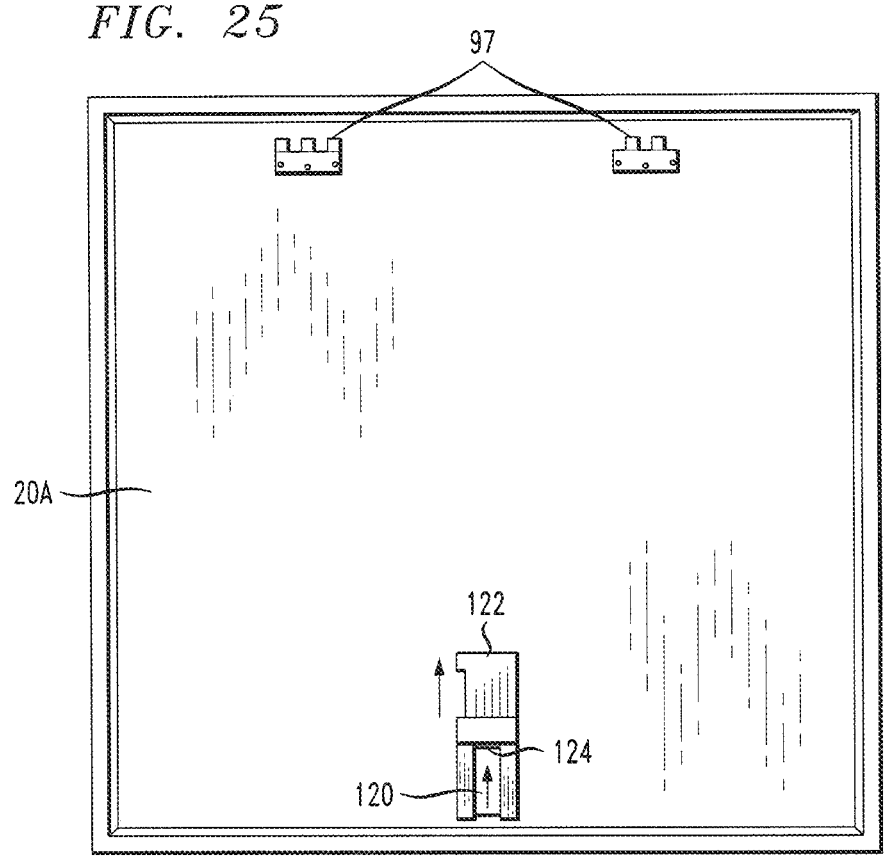
FIG. 25 is an interior view of the alternative lid, showing the latching mechanism in detail.

FIG. 25 is an interior view of lid 20A, showing the location of latching mechanism 120. Also illustrated in FIG. 25 is the pair of hinges 97 that mate with hinges 96 of rear wall 12RA (as shown in FIG. 22).

In most cases, it is further desirable to include an external locking mechanism that will thwart access to the generator enclosed within the alternative embodiment of protective housing 10A. FIG. 26 illustrates one exemplary locking mechanism 130 (with the understanding that various other configurations may be used, such as, for example, the securing strap arrangement discussed above in association with the preferred embodiment of protective housing 10). Here, for alternatively embodiment 10A, locking mechanism 130 comprises a locking bar 132, with a cap 134 disposed at a first termination of locking bar 132 and a stop block 136 disposed at a second, opposing end termination of locking bar 132. FIG. 27 shows locking mechanism 130 as used to lock sliding door 14A of front panel 12FA to lid 20A. Here, lid 20A is formed to include an aperture that allows locking bar 132 to pass through. Locking bar 132 similarly passes through an additional block 140 and then handle 14H of sliding door 14A. Cap 134 is positioned on lid 20A, and stop block 136 is positioned under handle 14H, where the attachment of cap 134 and stop block 136 prevents movement of sliding door 14A and securely locks together all of the panels used to form the alternative embodiment of protective housing 10A.

Summarizing, the present invention provides a safe, secure unit for housing a portable electric generator that is deployed outside and used to provide electricity to a residence (for example) during a power outage. The housing is formed of separate panels (base, lid, and four sidewalls) that are easy to fit together and interlock from the inside, providing a secure and rugged enclosure for the generator that is not easy for unwanted individuals to break into. Yet, when dismantling the housing, the panels neatly stack into an arrangement that may be stowed in the same area as the generator. Moreover, while intended to be used as a "temporary" housing (i.e., during a specific event when conventional power is not available), it is possible to permanently affix the base panel to some type of support structure (a concrete pad, for example) such that once all of the panels are in place the intent is not to dismantle the housing.

What is claimed is:

1. A portable housing for securely enclosing a portable electric generator, wherein the portable housing comprising
    a base panel of rectangular form upon which a portable electric generator may be positioned, the base panel including wall guiding channels formed around an interior perimeter thereof;
    a pair of side wall panels including interior wall guides sized to releasably engage with the base panel wall guiding channels as the pair of side wall panels are slid in place from front to back during placement on the base panel;
    a front wall panel disposed on the base panel between the pair of side wall panels at a front interior edge of the base panel, the front wall panel include an access door and releasable interior latching means for coupling the front wall panel to the pair of side wall panels;
    a rear wall panel disposed on the base panel at an interior rear edge thereof and positioned to releasably engage with the pair of side wall panels, the rear wall panel including releasable interior latching means for coupling the rear wall panel to the pair of side wall panels and an interior releasable hinge mechanism disposed proximate to a top edge of the rear wall panel; and
    a lid panel disposed over the combination of the pair of side wall panels, the front wall panel, and the rear wall panel in a manner where the lid panel is parallel to the base panel, the lid panel including an interior hinge mechanism for releasably engaging with the rear wall panel interior releasable hinge mechanism as the lid panel is positioned in place to form the portable housing, wherein
    at least one of a side wall panel and the rear wall panel include an exhaust vent for directing fumes produced by a portable electric generator away from the vicinity of the portable housing.

2. The portable housing as defined in claim 1 wherein the exhaust vent includes protective screening to maintain physical integrity of the portable housing.

3. The portable housing as defined in claim 1 wherein the pair of side wall panels further including a plurality of ventilation louvers.

4. The portable housing as defined in claim 1 wherein the lid panel is formed to comprise a lip portion surrounding the perimeter thereof, such that as the lid panel is closed in place, the lip portion extends over the exterior of the pair of side wall panels, the front wall panel, and the rear wall panel.

5. The portable housing as defined in claim 1 wherein the base panel further comprises a pair of stops disposed along a rear edge thereof, the pair of stops securing proper placement and alignment of the pair of side wall panels with respect to the base panel.

6. The portable housing as defined in claim 1 wherein the base panel further comprises a central knock-out portion for enabling permanent attachment of the portable housing at a desired location.

7. The portable housing as defined in claim 1 wherein the housing further comprises an interior lid locking mechanism for releasably attaching the lid panel to the front wall panel.

8. The portable housing as defined in claim 7 wherein the interior lid locking mechanism comprises
    a locking strap attached to the interior of the lid panel in proximity to a front edge thereof; and
    a ball lock formed on an interior surface of the front wall panel above the access door and accessible by opening the access door, wherein the locking strap is movable to releasably engage with the ball lock so as to securely attach the lid panel to the front wall panel, wherein the access door is thereafter closed and locked to create a secure, portable housing.

9. The portable housing as defined in claim 1 wherein the hinge mechanism comprises
    a pair of hinge hooks attached to the interior of the rear wall panel and disposed in proximity to the upper edge thereof, the pair of hinge hooks positioned in a spaced-apart manner; and
    a pair of hinge knobs attached to an underside of the lid panel and disposed in positions where the hinge knobs engage with the hinge hooks upon placement of the lid panel over the rear wall panel.

10. The portable housing as defined in claim 9 wherein the hinge mechanism further comprises additional hinge hooks and hinge knobs positioned between the pair of hinge hooks and the pair of hinge knobs.

11. The portable housing as defined in claim 1 wherein the access door is hinged to rotate outward from the front wall panel.

12. The portable housing as defined in claim 1 wherein the access door is formed as a sliding door and moves along between a pair of channels attached to the front wall panel.

13. The portable housing as defined in claim 1 wherein each of the panels is formed of a material selected from the group consisting of: steel, high density plastic, and fiberglass.

14. The portable housing as defined in claim 1 wherein the housing further comprises a pair of removable wheel ramps, the pair of removable wheel ramps engaging with a raised edge portion of the base panel and used to assist in the movement of a portable electric generator with respect to the portable housing, either to assist in placing the portable electric generator in the housing prior to engaging all of the panels or assist in removing the portable electric generator prior to disengaging all of the panels for storage.

* * * * *